Dec. 20, 1938.　　　W. C. MARSH　　　2,140,806
METHOD OF MAKING DIES
Filed May 15, 1937
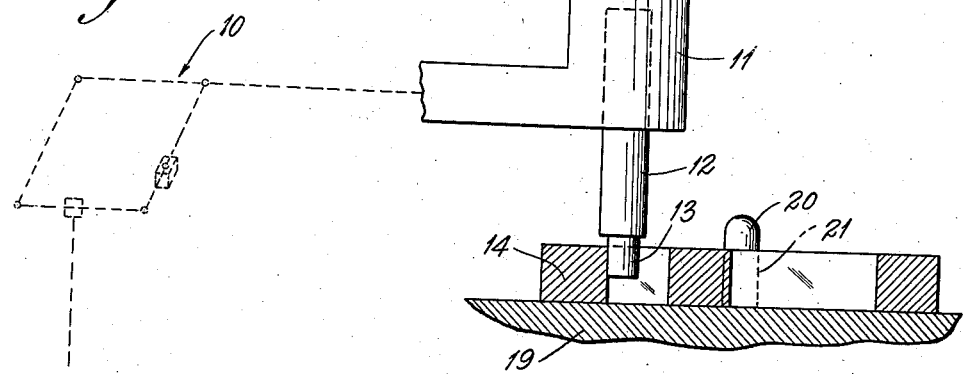
Fig. 1.
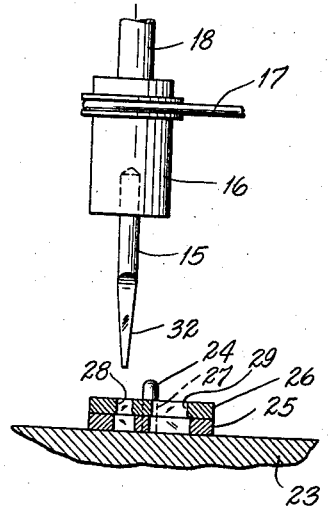
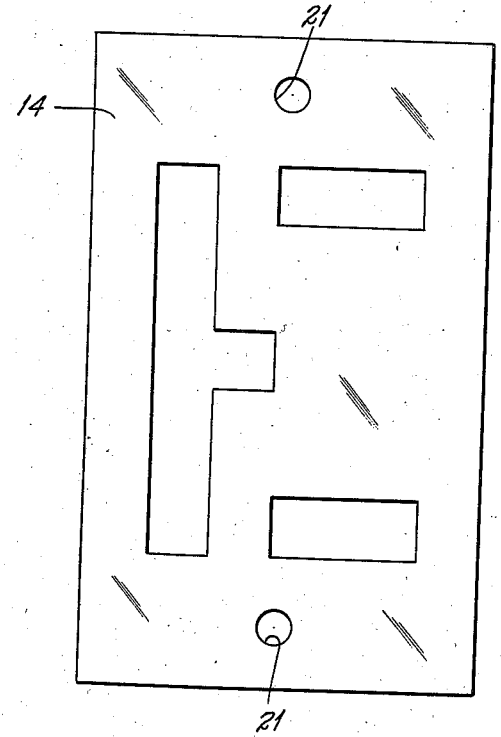
Fig. 2.
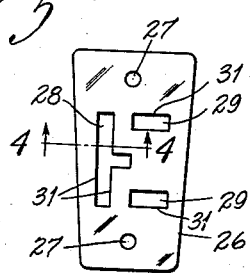
Fig. 3.
Fig. 4.
INVENTOR:
WALTON C. MARSH,
By Lawrence C. Kingsland,
ATTORNEY.

Patented Dec. 20, 1938

2,140,806

UNITED STATES PATENT OFFICE 2,140,806

METHOD OF MAKING DIES

Walton C. Marsh, Belleville, Ill.

Application May 15, 1937, Serial No. 142,724

2 Claims. (Cl. 76—107)

The present invention relates to a new method of making dies and particularly stencil dies to provide a proper clearance for the infitting of the punch.

Heretofore, the clearance draft on dies of this type has usually been formed by hand-filing. Efforts have been made to provide a cutting edge by machine methods, but such have never proved as satisfactory as the hand method. The present invention provides an eminently satisfactory mechanical method for obtaining this draft.

It is a primary object of the invention to provide a novel method for putting a draft into cutting dies to provide an edge against which their punches may work.

It is a further object of the invention to provide in such a method absolute and accurate control of the cutting operation providing a draft whereby a superior die is obtained.

In the drawing:

Fig. 1 is a partially diagrammatic view of mechanism for performing the method;

Fig. 2 is a view of the master templet for use therein;

Fig. 3 is a view of a die formed from this master templet; and

Fig. 4 is a section on the line 4—4 of Fig. 3.

The method embodies the use of a pantograph mechanism having a tool on it designed to give the desired angle of draft. In Fig. 1 the pantograph mechanism is shown at 10 diagrammatically, this diagram representing one of the ordinary parallelogram type pantographs. The pantograph has a tracing arm 11 with a tracing tool 12 therein having an accurately formed stylus 13 operable in a master pattern 14. At the operating end of the pantograph is a cutting tool 15 supported in a chuck 16 and rotated as by a belt 17 from a suitable power source. The chuck 16 is on an operating arm 18 of the pantograph. It will be understood that the pantograph is so designed as to reduce the amount of motion of the tool 15 from that of the stylus 13.

The templet 14 is supported on a suitable base 19 from which extend pins 20 that engage in holes 21 of the templet whereby the same is accurately located on the base 19. It will be understood that each letter is provided with a master templet, all of which have the same locating holes 21 engageable over the pins 20. Preferably, the templet 14 is approximately six times the size of the die itself.

A lower bed 23 upon which the work is done has pins 24 extending from it. Over these pins is placed a spacer plate 25 and above the spacer plate may be located a die 26 that has holes 27 therein engageable over the pins 24 whereby the die is accurately located.

In the particular illustration the letter E is shown. Fig. 1 shows a section through the top of this letter as it appears in Fig. 3. The spacer plate 25 has corresponding openings to those in the die but they are somewhat larger. The two particular openings appearing in the die 26 in Fig. 1 are designated at 28 and 29.

Stencil dies are ordinarily made from a piece of metal that may be, for example, about the size of that shown at 26 in Fig. 3 and with about the thickness as shown in Fig. 1. A master punch in a press operating on a blank of metal displaces the outline of the letter being made from the die blank and this displaced metal is subsequently welded onto a backing plate to form the punch. The punch, of course, has straight walls. If it were attempted to operate this punch in a straight-walled die, there would be frequent jammings of the machine. To avoid these, a draft shown at 30 in Fig. 4 is ordinarily provided and it makes sharp edges 31 around the top of the die, these edges being the cutting edges against which the punch operates.

The present method is as follows: The cutting tool 15 is given a rake 32 equal in angle with the desired draft 30. The spacer plate and die are then located on the pins 24, as shown in Fig. 1. A master templet 14 for the particular letter being cut is located over the pins 20. The stylus 13 is then traced around openings in the templet corresponding to those in the die. With the cutter operating in the die, the inner edges of the holes will be cut away to form the draft, as at 30 in Fig. 4, leaving a sharp cutting edge 31. In a very short while and with little difficulty the stylus may trace the letter in the templet, causing the tool to follow it and to put exactly the desired rake or draft in the die with no variations whatever.

Ordinarily, it is desired to cut back the edge 31 a very small distance so as to obviate the possibility of binding between the punch and the die when the two are brought together. This is done within precise limits by the present system, by controlling the lowering of the cutting tool, or by making the templet openings slightly oversize. It is, of course, understood that, in the proposed method, the pantograph tool is originally brought down a predetermined distance so that, in every case, the amount of cutting of the die will be the same.

By the use of this method the production of dies has been increased one thousand percent. Additionally, the number of rejects is reduced and the accuracy of the finished product is much greater.

What is claimed is:

1. In a method of making stencil dies, the steps of forming a die blank with the letter cut therethrough, locating said die accurately in a pantograph machine relative to an enlarged master templet, providing a cutting tool on the pantograph with a rake equal to the angle of draft desired in the die, lowering the cutting tool into the die a predetermined distance so that it will, when moved by movement of the stylus about the templet, cut the draft into the die, and cut back the cutting edge of the die to provide a slight clearance therein.

2. In a method of making stencil dies, the steps of forming a die blank with straight side walls defining the desired die opening, locating said die accurately in a pantograph machine relative to an enlarged master templet of a letter, locating the die blank adjacent the cutting tool of the pantograph and passing the stylus of the pantograph about the master pattern while maintaining the effective cutting edge of the tool relative to the die blank in such wise that said cutting edge provides a rake in the cut of the die blank equal to the angle of draft desired therein.

WALTON C. MARSH.